United States Patent [19]

Ikeguchi

[11] 4,370,462
[45] Jan. 25, 1983

[54] CURABLE RESIN COMPOSITION

[75] Inventor: Nobuyuki Ikeguchi, Tokyo, Japan

[73] Assignee: Mitsubishi Gas Chemical Company, Inc., Tokyo, Japan

[21] Appl. No.: 91,815

[22] Filed: Nov. 6, 1979

[30] Foreign Application Priority Data

Nov. 13, 1978 [JP] Japan .................................. 53-139721

[51] Int. Cl.³ ............................................. C08G 18/28
[52] U.S. Cl. ..................................... 528/73; 528/228; 528/229
[58] Field of Search ........................... 528/228, 229, 73

[56] References Cited

U.S. PATENT DOCUMENTS

| | | | |
|---|---|---|---|
| 3,743,685 | 7/1973 | Grosjean et al. | 260/860 |
| 3,752,793 | 8/1973 | Arlt et al. | 260/78.5 T |
| 3,879,349 | 4/1975 | Bilow et al. | 528/229 |
| 3,935,138 | 1/1976 | Wingler et al. | 260/17 R |
| 3,962,184 | 6/1976 | Notomi et al. | 260/47 CP |
| 4,110,364 | 8/1978 | Gaku et al. | 528/170 |
| 4,116,903 | 9/1978 | Lietz et al. | 260/29.6 NR |
| 4,180,493 | 12/1979 | Selbeck et al. | 260/32.8 N |

OTHER PUBLICATIONS

Billmeyer, Jr., Fred. J., Polymer Sci.: Part C, No. 8, pp. 161–178, (1965).

*Primary Examiner*—John Kight, III
*Assistant Examiner*—Amelia B. Yarbrough
*Attorney, Agent, or Firm*—Wenderoth, Lind & Ponack

[57] ABSTRACT

A curable resin composition comprising
(A) 80 to 99 parts by weight of a polyfunctional cyanate ester, a cyanate ester prepolymer, or a prepolymer of a cyanate ester and an amine, and
(B) 20 to 1 parts by weight of a polyimide of the following formula (I), (II) or (III)

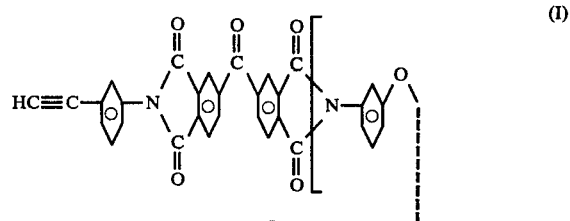

(I)

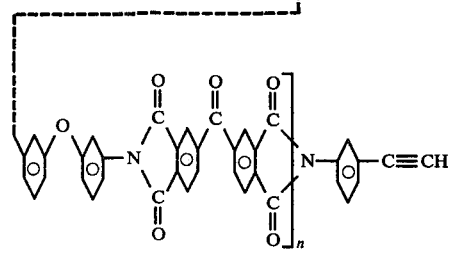

wherein n is an integer of from 1 to 5,

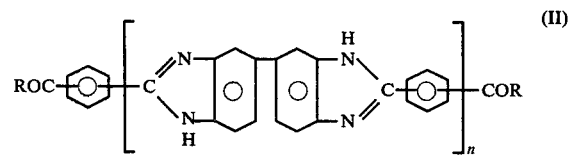

(II)

wherein n is an integer of from 1 to 5, and R is —OH, —NH₂,

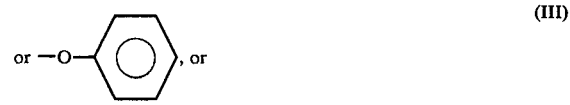

(III)

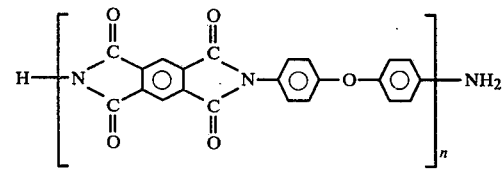

wherein n is an integer of from 1 to 5.

4 Claims, No Drawings

CURABLE RESIN COMPOSITION

BACKGROUND OF THE INVENTION

This invention relates to a novel curable resin composition. Polyimide is well known as a resin having very high thermal stability, but has poor solubility in solvents as is clearly seen from its molecular structure, etc. It is the usual practice, therefore, to obtain it in powder form and mold it into the desired shape, or to machine a cured product of the resin into the desired shape.

The present invention is based on the discovery that a mixture or preliminary reaction product of a specified polyimide resin and a specified cyanic acid ester has good solubility in solvents, enhanced processability, and improved properties.

SUMMARY OF THE INVENTION

According to this invention, there is provided a curable resin composition comprising (A) 80 to 99 parts by weight of a polyfunctional cyanate ester, a cyanate ester prepolymer, or a prepolymer of a cyanate ester and an amine, and (B) 20 to 1 parts by weight of a polyimide of the following general formula (I), (II) or (III)

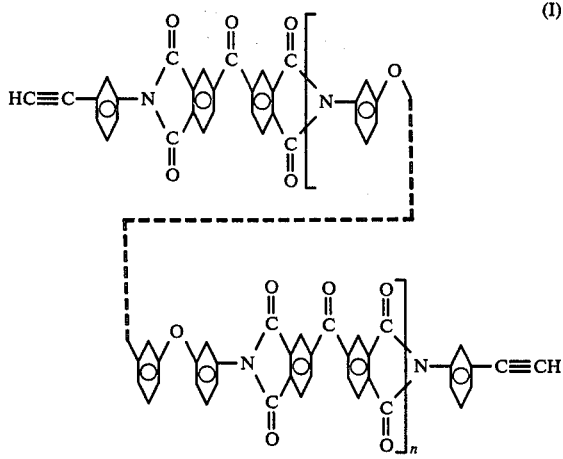

(I)

wherein n represents an integer of from 1 to 5,

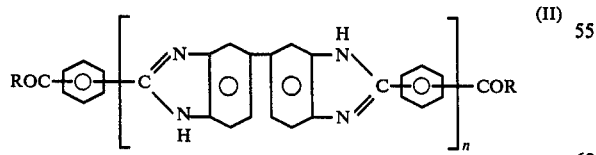

(II)

wherein n represents an integer of from 1 to 5, and R represents —OH, —NH$_2$, or the group

, or (III)

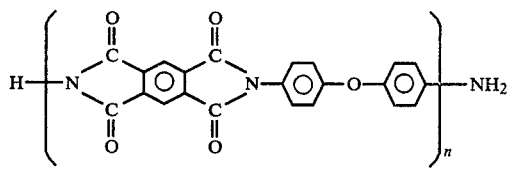

wherein n represents an integer of from 1 to 5.

DETAILED DESCRIPTION OF THE INVENTION

The polyimide (B) of general formula (I), (II) or (III), as one component of the curable resin composition of this invention, has a low molecular weight as shown above. The amount of the polyimide (B) is 20 to 1 parts by weight. These limitations are important to the reaction of the polyimide with the cyanic acid ester component and to the good solubility of the reaction product in solvents.

The cyanate ester component, another component of the curable resin composition of this invention, is selected from the group consisting of (i) a polyfunctional aromatic cyanate ester monomer having the formula $$R\!+\!O\!-\!C\!\equiv\!N)_n$$

wherein n is at least 2 and not more than 5 and R is an aromatic organic group, the cyanate groups being bonded to an aromatic ring of said aromatic organic group, (ii) a homoprepolymer of (i), and (iii) a coprepolymer of (i) and an amine. The polyfunctional aromatic cyanate ester monomer (i) is a compound of the general formula $$R\!+\!O\!-\!C\!\equiv\!N)_n \qquad (1)$$

wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

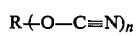

wherein $R_a$ and $R_b$ are the same or different and each represents a hydrogen atom or an alkyl group containing 1 to 4 carbon atoms,

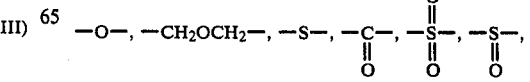

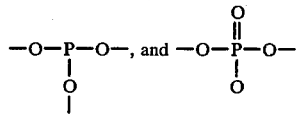

and a residue resulting from the removal of a phenolic hydroxyl group from a novolac type or resol-type phenolic resin skeleton; said aromatic nucleus is unsubstituted or substituted by a substituent selected from the group consisting of alkyl groups containing 1 to 4 carbon atoms, alkoxy groups containing 1 to 4 carbon atoms, chlorine and bromine; n is an integer of from 2 to 5; and the cyanate group is always directly bonded to the aromatic nucleus.

Examples of the polyfunctional aromatic cyanate ester monomer are dicyanatobenzene, tricyanatobenzene, dicyanatonaphthalene, tricyanatonaphthalene, 4,4′-dicyanatobiphenyl, bis(4-cyanatophenyl)methane, 2,2-bis(4-cyanatophenyl)propane, 2,2-bis(3,5-dichloro-4-cyanatophenyl)propane, 2,2-bis(3,5-dibromo-4-cyanatophenyl)propane, bis(4-cyanatophenyl)ether, bis(4-cyanatophenyl)thioether, bis(4-cyanatophenyl(-sulfone, tris(4-cyanatophenyl) phosphite, tris(4-cyanatophenyl) phosphate, and cyanate esters obtained by the reaction of novolaks with cyanogen halides. There can also be used the cyanate esters disclosed in Japanese Patent Publications Nos. 1928/66, 4791/69, 11712/70 and 4112/71, and Japanese Laid-Open Patent Publication No. 63149/76.

The aforesaid cyanate esters may be used as mixtures.

The homoprepolymer (ii) of the cyanate ester monomer is a polymer containing a triazine ring which is prepared by the trimerization of the cyanate group of the cyanic acid ester, and has a number average molecular weight of at least 400 but up to 6,000 at most. Such prepolymers are known per se, and can be prepared by polymerizing the above cyanic acid esters in the presence of, as a catalyst, an acid such as mineral acids or Lewis acids, a base such as sodium hydroxide, a sodium alcoholate or a tertiary amine, a salt such as sodium carbonate or lithium chloride, or a phosphorus compound such as tributyl phosphine.

The polyfunctional cyanate ester can be used in the form of a mixture of the monomer and the prepolymer. For example, many of commercially available cyanate esters derived from bisphenol A and cyanogen halides are in the form of a mixture of cyanate monomers and prepolymers, and such materials can also be used in the present invention.

The coprepolymer (iii) of the cyanate ester monomer and an amine can also be used as the cyanate ester component of this invention. Useful amines are polyamines of the general formula $$R^2(-NH_2)_n \qquad (2)$$

wherein $R^2$ is a polyvalent aromatic or alicyclic organic group, and n is an integer of from 2 to 5.

Examples of suitable amines include phenylenediamine, xylylenediamine, cyclohexanediamine, hexahydroxylylenediamine, 4,4′-diaminobiphenyl, bis(4-aminophenyl) methane, bis(4-aminophenyl)ether, bis(4-aminophenyl) sulfone, bis(4-amino-3-methylphenyl)methane, bis(4-amino-3,5-dimethylphenyl)methane, bis(4-aminophenyl) cyclohexane, 2,2-bis(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4′-aminophenylmethane, and 1,1-bis(4-aminophenyl)-1-phenylethane.

The coprepolymer can be produced by reacting the cyanate ester monomer with the amine, preferably using 0.1 to 1 equivalent of the diamine based on the cyanate ester monomer, in a suitable solvent such as ketones at a temperature of about 0° to 100° C. for 1 minute to 1 hour.

The two components, i.e. the polyimide component (B) and the cyanate ester component (A), may be used as a mere mixture with a conventional curing catalyst such as tertiary amines, imidazoles, organic metal salts, and halogenides. Or they may be used after preliminary reaction. The preliminary reaction may be carried out at 50° to 250° C., preferably 80° to 180° C., for 1 minute to 48 hours, preferably 1 to 10 hours, in the absence or presence of a solvent such as N-methylpyrrolidone, N,N-dimethylformamide, N,N-dimethylacetamide, methyl ethyl ketone, or dioxane.

Examples of suitable curing catalysts that can be used in this invention include imidazoles such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole and 1-guanaminoethyl-2-methylimidazole; trimellitic acid adducts of the aforesaid imidazoles; tertiary amines such as N,N-dimethylbenzylamine, N,N-dimethylaniline, N,N-dimethyltoluidine, N,N-dimethyl-p-anisidine, p-halogeno-N,N-dimethylanilines, 2-N-ethylanilinoethanol, tri-n-butylamine, pyridine, quinoline, N-methylmorpholine, triethanolamine, triethylenediamine, N,N,N′,N′-tetramethylbutanediamine and N-methylpiperidine; phenols such as phenol, cresol, xylenol, resorcinol and phloroglucin; organic metal compounds such as lead naphthenate, lead stearate, zinc naphthenate, zinc octylate, tin oleate, dibutyltin maleate, manganese naphthenate, cobalt naphthenate and acetylacetonatoiron; inorganic metal compounds such as $SnCl_4$, $ZnCl_2$ and $AlCl_3$; and peroxides such as benzoyl peroxide, lauroyl peroxide, caprylyl peroxide, acetyl peroxide, p-chlorobenzoyl peroxide, and ditertiary butyl diperphthalate. Also usable are compounds which are generally known as curing agents or catalysts for epoxy resins, such as acid anhydrides (e.g., pyromellitic anhydride).

If desired, the curable resin composition of this invention may further include a thermosetting resin such as polyfunctional maleimides and epoxy compounds.

Suitable polyfunctional maleimides are compounds of the following general formula

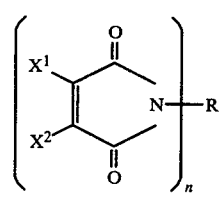

(3)

wherein R represents a divalent or trivalent aromatic or alicyclic organic group, $X^1$ and $X^2$ represent a hydrogen or halogen atom or an alkyl group, and n is an integer of from 2 to 5.

The maleimides of the above formula can be prepared by a known method which comprises reacting maleic anhydrides with amines having 2 to 5 amino groups, and then dehydro-cyclizing the maleamide acids. Compounds of formula (2) given above are preferred as the starting amines.

The epoxy compound used in this embodiment is a compound containing at least 1, especially at least 2, epoxy groups in the molecule. Generally, in view of the adhesion or intimate contact of the final resin products, the epoxy compounds desirably have an epoxy equivalent of 70 to 6000, especially 170 to 4000. One type of epoxy resins that can be suitably used in this invention is a bisepoxy compound of the following general formula (4)

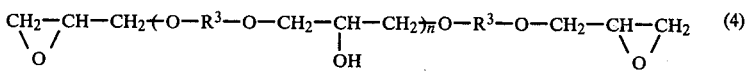

wherein n is zero or a positive number, preferably 0 to 12.

The same divalent organic groups cited hereinabove with regard to cyanate esters can be used as the divalent groups $R^3$ in formula (4).

These epoxy compounds, depending upon the extent of polymerization or the type of the divalent organic group contained in the main chain, are available in a wide range of forms from relatively low viscosity liquid to relatively high melting solid, but all of such epoxy compounds can be used in the present invention.

These epoxy compounds, especially bisepoxy compounds, are prepared by reacting polyhydric phenols with epihalohydrins such as epichlorohydrin in the presence of a base such as an alkali hydroxide. Instead of reacting polyhydric phenols with epihalohydrins, the diamines described in detail hereinabove with regards to the bismaleimides may be reacted with epihalohydrin to form bisepoxy compounds. Examples of epoxy compounds readily available and suitable for the object of this invention are those derived from bisphenol A, or a chlorine- or bromine-substituted derivative of bisphenol A, and epihalohydrins, or epoxy compounds derived from a precondensate of phenol and formaldehyde and epihalohydrins.

Various natural, synthetic and semi-synthetic resins may be added to the curable resin composition of this invention in amounts which do not adversely affect the inherent properties of the curable resin composition.

For example, the resin composition of this invention may further contain a reinforcing agent or filler in a fibrous or powdery form. Examples of the powdery reinforcing agents or fillers are inorganic powders, such as various carbon blacks, finely divided silica, calcined clay, basic magnesium silicate, powdery diatomaceous earth, alumina, boron nitride, calcium carbonate, magnesium carbonate, magnesia, kaolin, sericite, or mica. Examples of the fibrous reinforcing material are inorganic fibers such as ceramic fibers, asbestos, rock wool, glass fibers, slag wool, or carbon fibers, paper, pulp, wooden powder, cotton, linter, and various synthetic fibers such as polyimide fibers. The fibrous reinforcing material can be used in various forms such as fine fibers, staples, tows, webs, woven fabrics, or non-woven fabrics. These reinforcing materials or fillers can be used in an amount of up to 4 times the weight of the resin solid for use as laminating materials or molding materials, although the amount may vary according to the desired utility.

The resin compositions of this invention can also contain a white pigment such as titanium dioxide, a colored pigment such as yellow lead, carbon black, iron black, molybdenum red, prussian blue, ultramarine, cadmium yellow or cadmium red, and other various organic dyes and pigments in order to color the compositions. In addition to the above colored pigments, the resin compositions can also contain a rust-proofing pigment such as zinc chromate, red lead, red iron oxide, zinc flower or strontium chromate, an anti-sag agent such as aluminum stearate, a dispersing agent, a thickener, a coat modifier, a body pigment or a fire retardant, which are known additives for paints.

The curable resin composition of this invention has excellent solubility in solvents, and cured products therefrom have good electrical properties and good heat resistance to solder. It finds new applications, and is of high utilitarian value.

The following examples illustrate the present invention in greater detail.

EXAMPLE 1

900 g of 2,2-bis(4-cyanatophenyl)propane and 100 g of polyimide of formula (I) (THERMID 600, a trademark for a product of Gulf Oil Chemical Co.) were preliminarily reacted by mixing them with stirring at 140° C. for 60 minutes. The preliminary reaction product was dissolved in N-methyl pyrrolidone at room temperature to form a solution having a concentration of 50%. Further, 0.5 g of zinc octylate and 5 g of dimethylbenzylamine as a catalyst were mixed to form a varnish.

The resulting varnish was impregnated in glass cloths, and dried under heat to form B-stage prepregs. Eight prepregs so formed were stacked, and an electrolytic copper foil having a thickness of 35 microns was superimposed on both surface of the stacked assembly. The assembly was press-formed for 2 hours at 185° C. and 40 kg/cm² to obtain a copper-clad laminate.

The laminate was tested, and the results are shown in Table 1.

EXAMPLE 2

850 g of 2,2-bis(4-cyanatophenyl)ether was melted at 150° C., and 150 g of an imide resin of formula (I) was added. They were mixed at 150° C. for 60 minutes to perform preliminary reaction. The resulting uniform liquid was cooled at room temperature, and dissolved in N-methylpyrrolidone. Then, 100 g of a cresol novolac-type epoxy resin (ESCN 220F, a trademark for a product of Sumitomo Chemical Co., Ltd.) was dissolved in the resulting solution to form a solution having a concentration of 56% by weight. Further, 0.4 g of zinc octylate, 0.1 g of catechol and 0.4 g of triethylenediamine were added as a catalyst to form a varnish.

Using the resulting varnish, a laminate clad with copper at both surfaces was obtained in the same way as in Example 1. The laminate was tested, and the results are shown in Table 1.

REFERENCE EXAMPLE 1

300 g of the same polyimide as used in Example 1 was dissolved in 500 g of N-methylpyrrolidone at 150° C. When this solution was cooled to 100° C., the polyimide precipitated and adhered to the wall of the container. The solution was impregnated in glass cloths at 150° C. to form prepregs as in Example 1.

Eight prepregs so produced were stacked, and an electrolytic copper foil having a thickness of 35 microns was superimposed on both surfaces of the stacked assembly, and the entire assembly was press-formed at 185° C. and 40 kg/cm². To cure the polyimide completely, the laminate was press-formed at 250° C. for 4 hours to form a copper clad laminate.

The laminate was tested, and the results are shown in Table 1.

TABLE 1

| | Example 1 | Example 2 | Reference Example 1 |
|---|---|---|---|
| Solder heat resistance (350° C.) | more than 120 seconds | more than 120 seconds | Blister occurred in 5 seconds |
| Copper foil adhesion strength (kg/cm) | 1.70 | 1.65 | 1.35 |
| Glass transition point (°C.) | 265 | 280 | 290 |

EXAMPLE 3

80 parts of 2,2-bis(4-cyanatophenyl)propane, 20 parts of an imide resin of formula (II) (average molecular weight 560) and 5 parts of bisphenol F-type epoxy resin (Epikote 152, a trademark for a product of Shell Chemical Co.) were mixed at 150° C. for 70 minutes to react them preliminarily and to obtain a uniform liquid resin at the same temperature. The resulting resin was charged into a mold, and cured at 160° C. for 5 hours and at 200° C. for 5 hours to form a cured product having a glass transition temperature (Tg) of 270° C. and a flexural strength of 12 kg/mm².

EXAMPLE 4

83 parts of 2,2-bis(4-cyanatophenyl)propane, 17 parts of an imide resin of formula (III) (average molecular weight 700), and 7 parts of bisphenol F-type epoxy resin (Epikote 807, a trademark for a product of Shell Chemical Co., Ltd.) were mixed at 145° C. for 90 minutes to react them preliminarily, and then dissolved in a mixture of dimethylformamide and methyl ethyl ketone (20:80). Further, 0.2 part of zinc octylate was added as a catalyst. The resulting solution was coated on an iron plate, and cured at 160° C. for 4 hours. The coated film has superior properties as shown in Table 2.

TABLE 2

| Adhesion strength (Crosscut method; 1 mm² × 100) | 100/100 |
|---|---|
| Gloss | Yes |
| Pencil hardness | 3H |

What we claim is:

1. A curable resin composition comprising
(A) 80 to 99 parts by weight of a polyfunctional aromatic cyanate ester monomer, an aromatic cyanate ester homoprepolymer, or a coprepolymer of an aromatic cyanate ester and an amine of the formula $R^2-NH_2)n$ wherein $R^2$ is a polyvalent aromatic or alicyclic organic group, and n is an integer of from 2 to 5, and (B) 20 to 1 parts by weight of a compound of the formula (I)

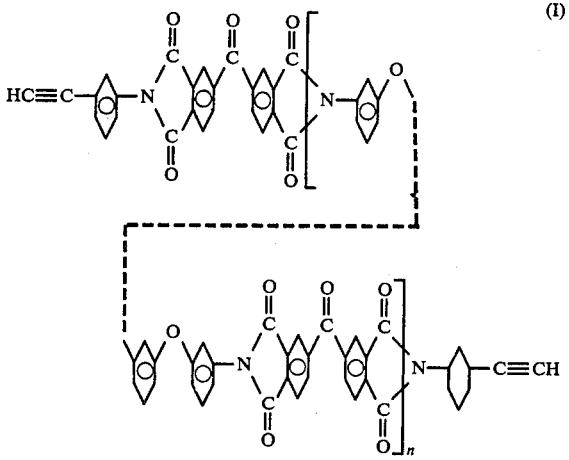

wherein n is an integer of from 1 to 5.

2. The curable resin composition of claim 1 wherein said homoprepolymer of an aromatic cyanate ester is a polymer containing a triazine ring which is prepared by the trimerization of the cyanate group of the cyanic acid ester, and has a number average molecular weight of from 400 to 6,000.

3. The curable resin composition of claim 1 wherein said coprepolymer of the aromatic cyanate ester and an amine is a coprepolymer prepared by reacting the aromatic cyanate ester with an amine selected from the group consisting of phenylenediamine, xylylenediamine, cyclohexanediamine, hexahydroxylylenediamine, 4,4'-diaminobiphenyl, bis(4-aminophenyl)methane, bis(4-aminophenyl) ether, bis(4-aminophenyl)sulfone, bis(4-amino-3-methylphenyl) methane, bis(4-amino-3,5-dimethylphenyl)methane, bis(4-aminophenyl) cyclohexane, 2,2-bis(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane, and 1,1-bis(4-aminophenyl)-1-phenylethane.

4. The curable resin composition of claim 1 wherein said polyfunctional aromatic cyanate ester monomer is a compound of the formula $R-O-C\equiv N)_n$ wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

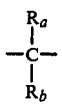

wherein $R_a$ and $R_b$ are the same or different and each represents a hydrogen atom or an alkyl group containing 1 to 4 carbon atoms,

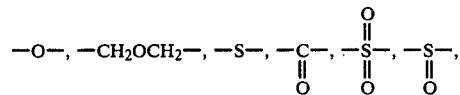

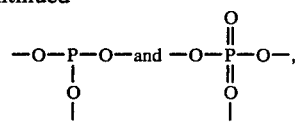

and a residue resulting from the removal of a phenolic hydroxyl group from a novolac type or resol-type phenolic resin skeleton; said aromatic nucleus is unsubstituted or substituted by a substituent selected from the group consisting of alkyl groups containing 1 to 4 carbon atoms, alkoxy groups containing 1 to 4 carbon atoms, chlorine and bromine; n is an integer of from 2 to 5; and the cyanate group is always directly bonded to the aromatic nucleus.

* * * * *